(12) United States Patent
Gunselmann et al.

(10) Patent No.: US 12,715,305 B2
(45) Date of Patent: Aug. 25, 2026

(54) METHOD FOR CONTROLLING THE ROTATIONAL SPEED OR THE TORQUE OF A MOTOR, ROTATIONAL SPEED CONTROL SYSTEM AND CONTROL DEVICE

(71) Applicant: AUMOVIO Germany GmbH, Frankfurt am Main (DE)

(72) Inventors: Christian Gunselmann, Eschborn (DE); Bogdan Budianu, Oberursel (DE); Andreas Donner, Frankfurt am Main (DE); Albert Cimpoesu, Buruienesti (DE)

(73) Assignee: AUMOVIO Germany GmbH, Hanover (DE)

( * ) Notice: Subject to any disclaimer, the term of this patent is extended or adjusted under 35 U.S.C. 154(b) by 473 days.

(21) Appl. No.: 17/249,757

(22) Filed: Mar. 11, 2021

(65) Prior Publication Data

US 2022/0185123 A1 Jun. 16, 2022

Related U.S. Application Data

(63) Continuation of application No. PCT/EP2019/070313, filed on Jul. 29, 2019.

(30) Foreign Application Priority Data

Sep. 11, 2018 (DE) ..................... 10 2018 215 432.5

(51) Int. Cl.
*B60L 15/20* (2006.01)
*H02P 6/08* (2016.01)
*H02P 29/68* (2016.01)

(52) U.S. Cl.
CPC ............ *B60L 15/2009* (2013.01); *H02P 6/08* (2013.01); *H02P 29/68* (2016.02);
(Continued)

(58) Field of Classification Search
CPC ........... B60L 15/2009; B60L 2240/421; B60L 2240/423; B60L 2240/525; B60L 3/003;
(Continued)

(56) References Cited

U.S. PATENT DOCUMENTS 6,483,271 B1 11/2002 Thebeau
9,973,134 B1 5/2018 Namuduri et al.
(Continued)

FOREIGN PATENT DOCUMENTS

DE 10106944 A1 9/2002
DE 102016210900 A1 12/2016
(Continued)

OTHER PUBLICATIONS allaboutcircuits.com, Zener Diodes: Chapter 3—Diodes and Rectifiers, 2017, allboutcircuits.com, pp. 1-5 (Year: 2017).*
(Continued)

*Primary Examiner* — Aniss Chad
*Assistant Examiner* — Chase L Cooley
(74) *Attorney, Agent, or Firm* — Buchanan Ingersoll & Rooney PC

(57) ABSTRACT

A method for controlling the rotational speed or the torque of a motor to protect a suppressor diode in a control device of a vehicle, wherein the suppressor diode converts recuperation energy of the motor into thermal energy comprises determining the current junction temperature and/or diode voltage of the suppressor diode; and controlling the rotational speed or the torque of the motor by means of the current junction temperature and/or diode voltage in such a way that the junction temperature of the suppressor diode does not exceed a predetermined junction temperature limit value.

20 Claims, 6 Drawing Sheets

(52) U.S. Cl.
CPC ... *B60L 2240/421* (2013.01); *B60L 2240/423* (2013.01); *B60L 2240/525* (2013.01)

(58) Field of Classification Search
CPC .... B60L 7/02; H02P 6/08; H02P 29/68; H02P 3/12; H02P 3/14; H02P 29/02; H02P 29/032; H02M 1/327; H02M 5/458; G01R 31/2632
See application file for complete search history.

(56) References Cited

U.S. PATENT DOCUMENTS

| | | | | |
|---|---|---|---|---|
| 2011/0190970 | A1 | 8/2011 | Moriya | |
| 2012/0256422 | A1* | 10/2012 | Fradella | H02K 3/47 290/55 |
| 2016/0226421 | A1* | 8/2016 | Kadry | H02P 29/032 |
| 2017/0085208 | A1* | 3/2017 | Yamamoto | H02P 3/18 |
| 2017/0250644 | A1 | 8/2017 | Ikai | |

FOREIGN PATENT DOCUMENTS

| | | | |
|---|---|---|---|
| DE | 102017103573 | A1 | 8/2017 |
| DE | 102016003738 | A1 | 10/2017 |
| EP | 0161906 | A2 | 11/1985 |
| JP | H06245563 | A | 9/1994 |
| JP | 2016015793 | A | 1/2016 |
| KR | 20150105182 | A | 9/2015 |
| KR | 20180023839 | A | 3/2018 |
| WO | 2011073829 | A1 | 6/2011 |

OTHER PUBLICATIONS

Onsemi, Zener Theory and Design Considerations Handbook, 2017, www.onsemi.com, Rev. 1, pp. 1-9 (Year: 2017).*
European Examination Report dated Jan. 23, 2023 for the counterpart European Patent Application No. 19 748 778.8.
German Search Report dated Sep. 19, 2018 for the corresponding German Patent Application No. 10 2018 215 432.5.
International Search Report and the Written Opinion of the International Searching Authority mailed on Sep. 26, 2019 for the counterpart PCT Application No. PCT/EP2019/070313.
Korean Decision for Grant of Patent dated Feb. 20, 2023 for the counterpart Korean Patent Application No. 10-2021-7004954.
Chinese First Office Action dated May 5, 2023 for the counterpart Chinese Patent Application No. 201980055388.6 and DeepL translation of same.
Notice of Second Office Action dated Nov. 24, 2023 for the counterpart Chinese Patent Application No. 201980055388.6 and translation of same.

* cited by examiner

METHOD FOR CONTROLLING THE ROTATIONAL SPEED OR THE TORQUE OF A MOTOR, ROTATIONAL SPEED CONTROL SYSTEM AND CONTROL DEVICE

CROSS-REFERENCE TO RELATED APPLICATIONS

This application claims the benefit of PCT Application PCT/EP2019/070313, filed Jul. 7, 2019, which claims priority to German Application 10 2018 215 432.5, filed Sep. 11, 2018. The disclosures of the above applications are incorporated herein by reference.

TECHNICAL FIELD

The invention relates to a method for controlling the rotational speed or the torque of a motor and a rotational speed control system and to a control device therefor.

BACKGROUND

When a brushless DC (BLDC) motor is used to drive a hydraulic piston in the brake system of a vehicle, the rotation of the motor is converted into a linear movement of the piston via a spindle screw drive in order to modulate the brake pressure. In this way, electrical energy is converted into hydraulic energy for braking. At the end of a braking process, the motor is operated in the opposite direction, with the result that the hydraulic energy is converted back into electrical energy by the BLDC motor via the spindle screw drive. This operation is also called recuperation. The amount of electrical energy depends on the stored hydraulic energy, the efficiency of the spindle thread and the efficiency of the electric drive.

The following options are available for discharging the recuperated electrical energy: a) feeding back into the on-board electrical system of the vehicle; b) feeding back into an energy store; and c) conversion into thermal energy.

If the driver brakes heavily (large amount of hydraulic energy) and quickly takes his foot back off the pedal at the end of the braking process (short period of time for the recuperation), a lot of electrical energy must be dissipated in a short time. Options a and b mentioned are not suitable for this.

Feeding back into the vehicle's on-board system (option a) would lead to voltage fluctuations and excessive voltage levels and possibly to damage to electrical systems. Capacitors can be used for feeding back into an energy store (option b). In the event of a strong braking process, the voltage of the capacitors would either rise to a very high level where damage to the control devices may be possible or the capacitance of the capacitors would have to be given a very large dimension, i.e. high costs.

To convert the recuperation energy into thermal energy (option c), power resistors (for converting high energy) or power Zener diodes or suppressor diodes (for converting medium energy) are used according to the state of the art. The diodes are the suitable components for absorbing the amount of electrical energy of a strong and abruptly ending braking process (converting it into thermal energy) and at the same time effectively limiting the voltage. Depending on the amount of energy and dynamics (period of time of recuperation), the junction temperature of the suppressor diode increases during the conversion. However, the junction temperature of the diode is not known. If it rises above a limit value, the diode can be damaged or destroyed.

To prevent excessive self-heating, the diode current would have to be limited (in the reverse direction). However, this is usually not known. According to the state of the art, the motor rotational speed is therefore generally limited with a fixed value.

However, the system is unnecessarily restricted in its function due to the general limitation of the current or rotational speed. In the case of a non-critical (low) junction temperature, a higher diode current or a higher motor rotational speed would be unproblematic. In addition, a general limitation can result in thermal destruction of the diode, since the diode temperature is not known.

Therefore, a method and a device which improve the limitation of the current and/or rotational speed in order to protect the suppressor diode is desired.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for controlling the rotational speed or the torque of a motor in order to protect a suppressor diode in a control device of a vehicle, wherein the suppressor diode converts recuperation energy of the motor into thermal energy, comprises determining the current junction temperature and/or diode voltage of the suppressor diode; controlling the rotational speed or the torque of the motor by means of the current junction temperature and/or diode voltage (in the reverse direction) in such a way that the junction temperature of the suppressor diode does not exceed a predetermined junction temperature limit value.

The motor may be a three-phase motor. The junction temperature limit value may be defined in such a way that the value is below a critical value at which overheating and/or destruction of the diode (=suppressor diode) would occur.

By controlling the rotational speed or the torque of the motor in such a way that the junction temperature of the suppressor diode does not exceed a predetermined junction temperature limit value, the suppressor diode is protected from overheating and destruction. The current junction temperature may be determined indirectly by measuring the current diode voltage. Because the junction temperature is linearly correlated with the diode voltage, the diode voltage can be converted into the junction temperature in a simple manner. For example, controlling the rotational speed in the context of the invention can mean limiting the rotational speed or the torque.

In one development, the following steps are carried out for the method:

- measuring the current diode voltage,
- determining the current recuperation power of the motor,
- determining a power factor using the diode voltage and derating information,
- determining a target power by multiplying the power factor by the current recuperation power,
- determining a speed limit value by means of the target power,
- limiting the rotational speed of the motor on the basis of the speed limit value.

Operating in the order shown may be beneficial under certain circumstances. One skilled in the art would be able to determine which order of the steps would be beneficial for a particular control design.

In one development, a dependence between the junction temperature or diode voltage and a power factor is stored in the derating information. A lower threshold value and an upper threshold value may be defined here. The power factor may be determined as a function of the measured diode voltage. This power factor is then multiplied by the current recuperation power, which then results in a target power. A speed limit value may subsequently be calculated using the target power.

The calculations may be carried out by a computing unit. A control loop controls the rotational speed of the motor in accordance with the calculations of the computing unit, taking into account the speed limit value.

The magnitude of the control intervention according to the above-mentioned method is thus determined as a function of the junction temperature of the suppressor diode. The derating information is selected in such a way that the control intervention becomes active when the lower threshold value (lower limit temperature) is exceeded, and the speed is reduced to the maximum extent when the upper threshold value (upper, critical, limit temperature) is exceeded, with the result that the diode can no longer heat up.

In the case of a temperature measurement (or equivalent voltage measurement) that exceeds the lower threshold value, the control intervention is therefore preferably carried out as a function of the recuperation power of the motor and the defined derating behavior (derating information).

In one development, the method is carried out only when the diode is conductive. In one method step, it may be determined whether the diode is conductive. If this is the case, the further method steps are carried out. Such a procedure ensures that the control intervention does not occur unnecessarily, for example, if the diode voltage exceeds the lower threshold value, even though the diode is not yet conducting.

The transition to a conductive state of the diode can be seen at a voltage inflection point. In one development, the conductivity of the diode is determined using the following: determining the current recuperation current of the motor, determining the current capacitor current, and calculating the current diode current from the recuperation current and the capacitor current.

In this context, the recuperation current may be calculated, e.g. from values from a measurement of the motor terminal voltages and values from a measurement of the motor phase currents. Furthermore, the capacitor current may also be calculated from the gradient of the capacitor voltage and the capacitance value of the capacitor.

In the case of recuperation, the diode current may be calculated from the difference between the recuperation current and the capacitor current. As soon as the calculated diode current exceeds a threshold value, the diode begins to conduct and the associated diode voltage is measured as a calibration value and saved.

In an alternative development, in addition to the suppressor diode, the motor can also be used to convert electrical energy into thermal energy. For this purpose, the reactive current in the motor is increased, while at the same time the maximum recuperation power is reduced according to the derating information. In this way, the rotational speed of the motor does not have to be limited so much and the dynamics of the braking process increase.

In another development, the suppressor diode is calibrated, for which the following steps are carried out: energizing the diode with a current in the reverse direction of the diode; and measuring the diode voltage.

This calibration can be embodied either as an initial calibration or as a regular recalibration. The initial calibration reduces the error in the voltage measurement due to manufacturing tolerance and the recalibration improves the accuracy of the voltage measurement with regard to aging drift. As a result of increasing the accuracy of the voltage measurement the motor rotational speed is not limited unnecessarily early (i.e. when the diode junction temperature is not critical).

In another development, the calibration is an initial calibration.

The measurement of the junction temperature of a suppressor diode is may be based on the temperature dependence of its voltage/current characteristic. For example, the quadrant of the characteristic curve is essentially used for the current flow in the reverse direction. When there is a low reverse current, the Zener voltage has an almost linear dependence on the temperature. The spread of this temperature dependence is also almost not subject to any manufacturing tolerance. This applies to diodes in which the avalanche effect is more pronounced than the Zener effect (Zener voltage>>>5V).

The linear relationship can be described as follows (for low reverse currents):

$$Uz=f(T);$$

$$Uz(T)=Uzx(Tx)+a*(T-Tx);$$

where T is the diode junction temperature, Uz is the breakdown voltage of the suppressor diode, a is the gradient of the linear voltage-temperature relationship at low current, Uzx is the offset of the linear voltage-temperature relationship at low current and Tx is the temperature value for which the offset value Uzx is specified.

The offset (offset) of this function is usually subject to a pronounced manufacturing tolerance. In order to be able to use this function for temperature measurement, the offset Uzx(Tx) must be adjusted (calibrated) individually.

Neither the gradient nor the offset are subject to a significant change due to the aging of the diode. This property permits an initial calibration of the offset, for example during the production of the control device.

In another development, the initial calibration is carried out when a thermal equilibrium with the environment is established. At this point in time the junction temperature is the same as the ambient temperature. The diode is then energized with a low current in the reverse direction and the diode voltage is measured at the same time. The diode voltage may be measured with a precision voltmeter. In this way the offset Uzx(Tx) is determined. The gradient may be taken from the data sheet of the diode. In particular, the gradient is stored in a memory as a predefined parameter.

When calibrating with this method, the accuracy of the temperature measurement while the control device is operating is subject to the accuracy of the voltage measurement of the control device;

$$T=(Uz-Uzx(Tx))/a+Tx;$$

where Accuracy (T)=Accuracy (Uz)/a

To improve the accuracy of the temperature measurement, either the accuracy of the voltage measurement in the control device can be increased by using more precise components or the Uz (T) function can be recalibrated regularly during operation (online calibration or recalibration).

In another development, the calibration is a regular recalibration. The two types of calibration (initial calibration and recalibration) can be used as alternatives to one another or in addition to one another.

Regular recalibration improves the accuracy of the voltage measurement with regard to aging drift.

For regular recalibration, the diode is briefly energized in the reverse direction. This happens, for example, by accelerating and rapidly braking the motor, which triggers a recuperation pulse. During this process, the diode voltage is measured continuously.

First, the recuperation energy of the motor flows into the DC energy storage (usually capacitors). The capacitors are charged and the capacitor voltage increases. The voltage of the parallel suppressor diode also rises, but initially without current flowing through the diode. As soon as the capacitor voltage exceeds the Zener voltage of the diode, a reverse current begins to flow through the suppressor diode. The voltage across the diode remains almost constant. Only the temperature dependence of the Zener voltage leads to a very low voltage gradient owing to the self-heating of the diode. To determine the Zener voltage of the diode, the diode voltage must be measured precisely at the point in time at which the diode becomes conductive, i.e. precisely at the inflection point of the voltage.

The steps already described above are carried out to detect when the diode changes to the conductive state.

The temperature value Tx may also be estimated with the aid of a reference temperature measurement. It may be ensured here that the diode was in thermal equilibrium with the reference temperature sensor in the period before the recuperation pulse.

In the same way as with the initial calibration, the offset Uzx(Tx) of the diode equation is now known.

A rotational speed control system for performing the method described above is also described herein. The rotational speed control system has a control loop and a computing unit for this purpose. Furthermore, a control device for a vehicle with a previously mentioned rotational speed limiting system is also described herein.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, by way of example and in a schematic view.

DETAILED DESCRIPTION

Figure 1:
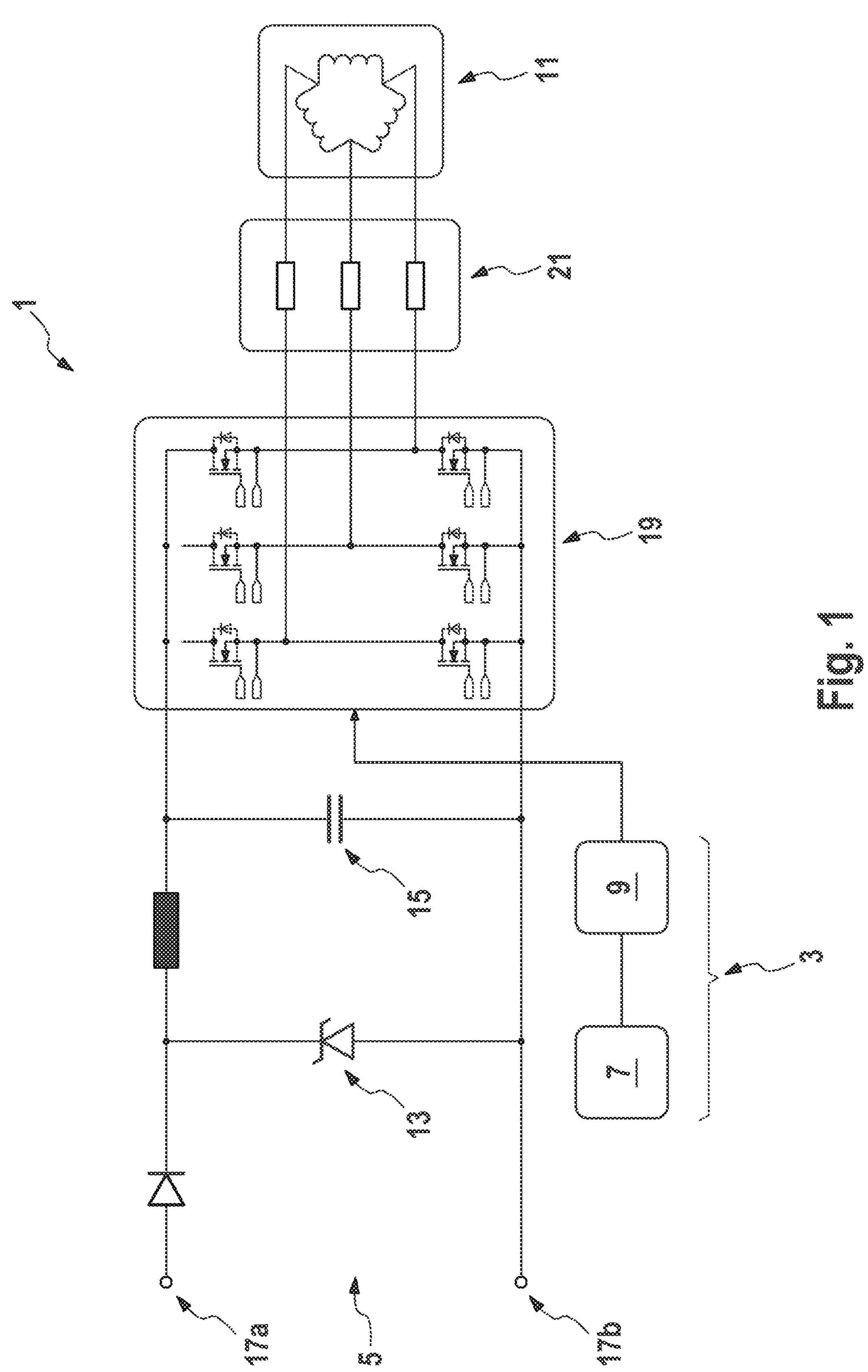
FIG. 1 shows an exemplary design of a system for actuating a three-phase motor with rotational speed control or torque control.

FIG. 1 shows a schematic and exemplary rotational speed control system 1 (system for actuating a three-phase motor with rotational speed control) with a computing unit 3 and a control loop 5. The computing unit 3 comprises a microprocessor 7 and a PWM output unit 9. The PWM output unit 9 can alternatively also be implemented independently of the computing unit 3. The control loop for controlling a motor 11 comprises a (suppressor) diode 13 for limiting the voltage and converting the recuperation energy and, in parallel, a capacitor 15 for stabilizing the DC link voltage. In addition, the control loop includes units (not shown) for measuring the variables of the motor rotational speed, motor position, DC link voltage (via the capacitor 15 and the diode 13) and phase currents and phase voltages for the three phases. Starting from the connections for the on-board power supply 17*a, b*, a B6 bridge 19 is operated, which then drives the motor 11 via phase resistors 21 (can also be referred to as phase current measuring resistors). The motor 11 is may be embodied as a three-phase motor, for which reason the phase resistors 21 and the B6 bridge 19 are each designed for three phases.

If the system is operated in recuperation mode, the recuperation energy first flows from the motor into the capacitor. Said capacitor is charged and the capacitor voltage increases. Initially, no current flows through the parallel suppressor diode 13, but the voltage increases. As soon as the capacitor voltage has exceeded the Zener voltage of the diode, a reverse current begins to flow through the suppressor diode 13. The voltage at the diode 13 remains almost constant. However, there is a temperature dependence of the Zener voltage and, owing to the self-heating of the diode, this brings about a very low voltage gradient.

Figure 2:
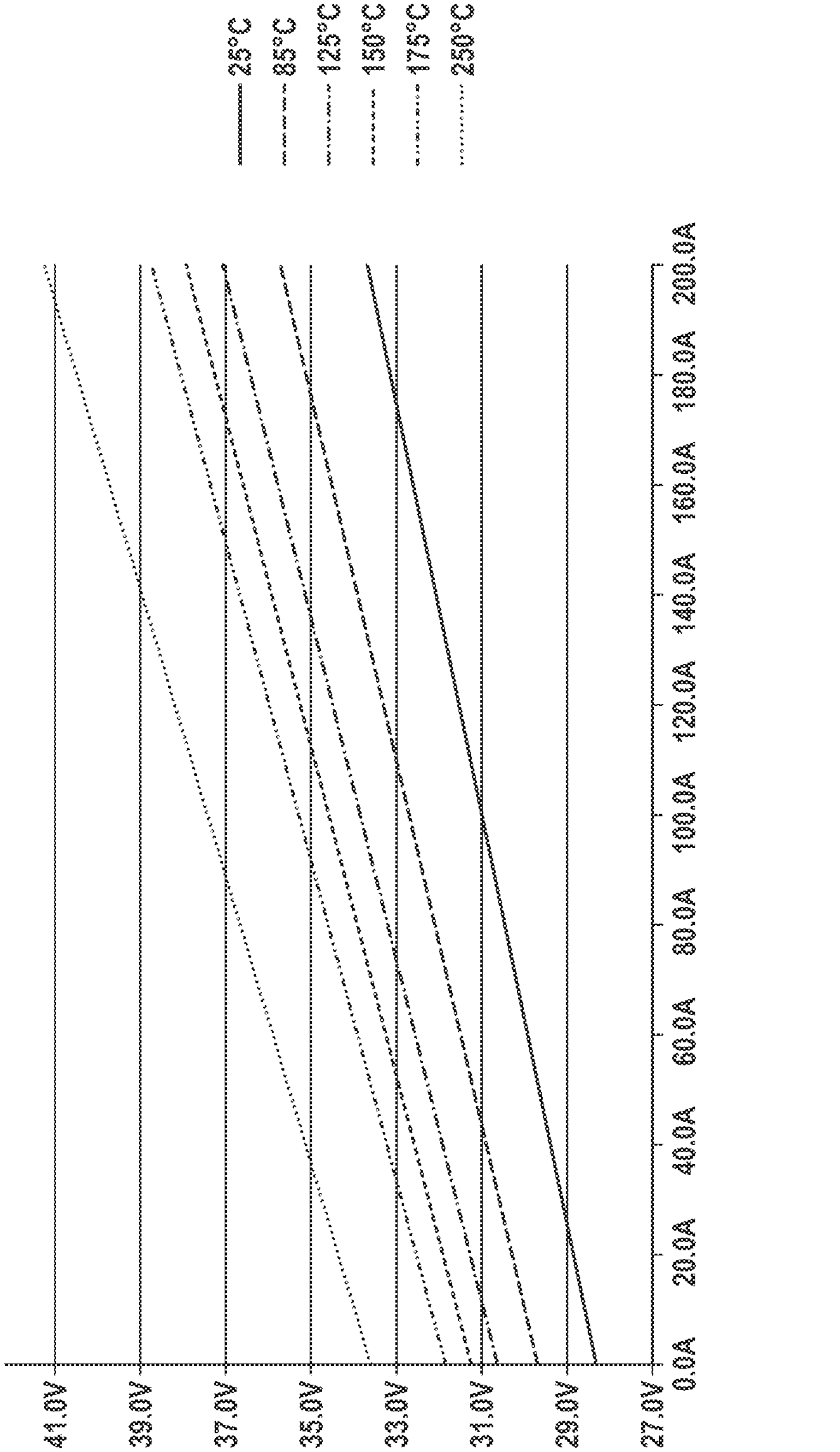
FIG. 2 shows an exemplary diagram of the dependence of the Zener voltage on the temperature and the current.

FIG. 2 shows the temperature dependence of the voltage/current characteristic of the diode. The quadrant of the characteristic curve for current flow in the reverse direction is primarily used. When the reverse current is low, the Zener voltage has an almost linear dependence on the temperature. The gradient is hardly subject to any manufacturing tolerance (for diodes in which the avalanche effect is greater than the Zener effect). Overall, this forms one basis for calculating the temperature by measuring the Zener voltage with a low reverse current.

However, the offset may be affected by a pronounced manufacturing tolerance. This offset can be adjusted or calibrated individually to increase the accuracy.

Figure 3:
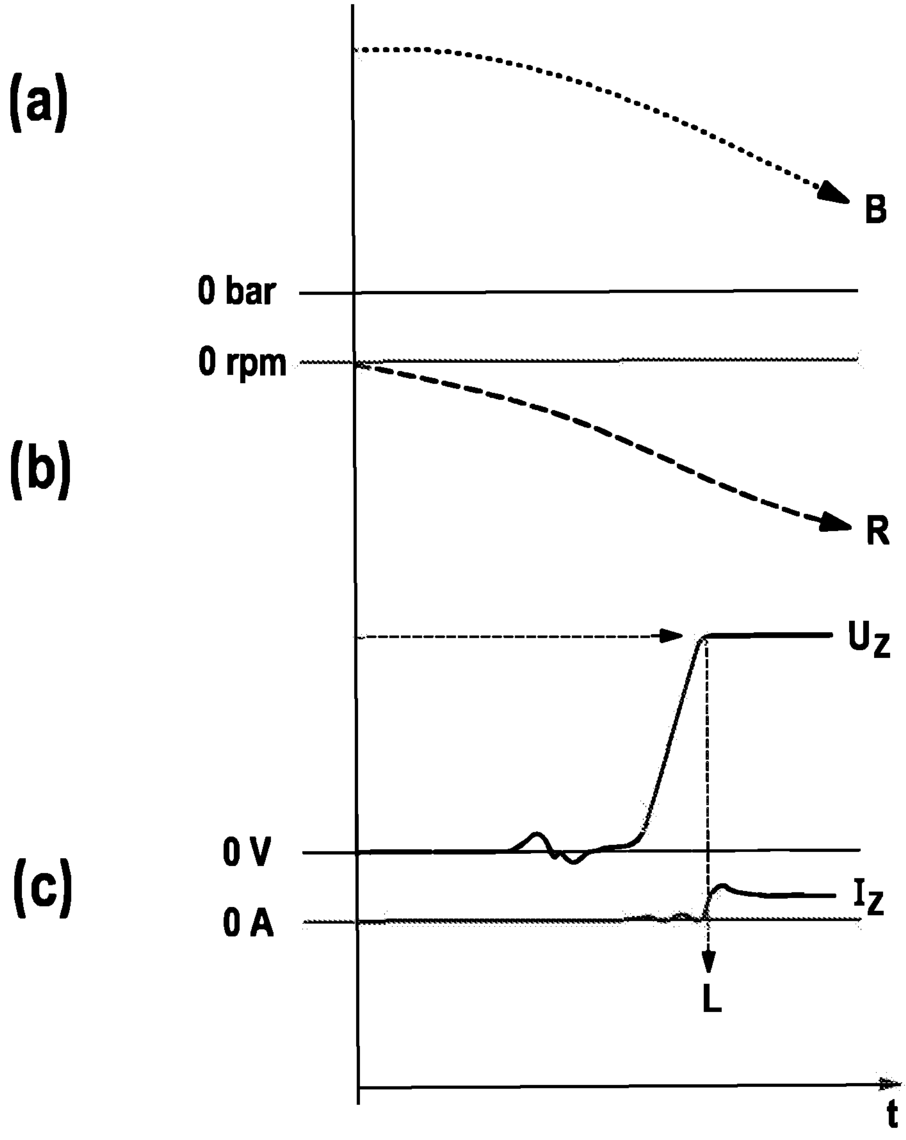
FIG. 3 shows an exemplary scenario for the releasing of the brake.

FIG. 3 shows an exemplary scenario for the releasing of a brake over time t. When the rotational speed R of the motor decreases (view (b) in FIG. 3), at least in relative terms, the brake pressure of the motor B (view (a) in FIG. 3) also decreases. Meanwhile, the Zener voltage Uz (measured) in the suppressor diode increases. If a certain threshold value is exceeded, the diode begins to conduct (point in time L)

and the Zener voltage Uz does not rise any further. This is manifested at the same time as a rapid increase in the current Iz (calculated) in the suppressor diode (view (c) in FIG. 3). Alternatively, the current Iz could also be measured.

Figure 4:
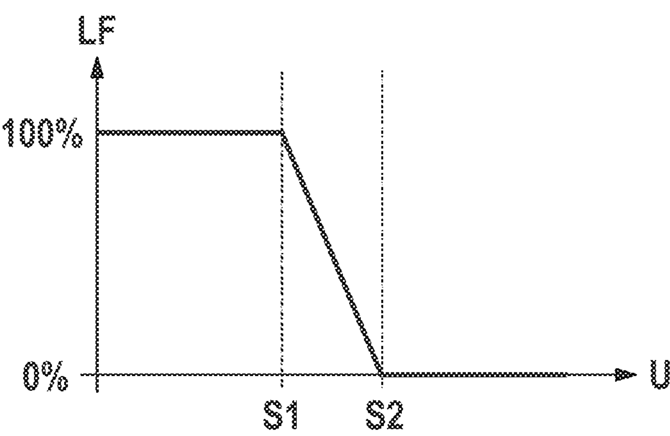
FIG. 4 shows an exemplary representation of derating information.

FIG. 4 shows an exemplary representation of derating information such as could be used for the method according to the invention. A power factor LF is plotted on the y-axis, and the diode voltage U is plotted in the reverse direction on the x-axis. The diode voltage U (in the reverse direction) is to be equated with the junction temperature, which is linearly related to the diode voltage U. When the voltage is low, there is no reduction in the power factor LF, so that the rotational speed is not reduced. When the voltage U rises, a lower threshold value S1 is initially exceeded, with the result that the power factor LF begins to drop. The power factor LF determines here the level of the speed limit value, i.e. the value to which the rotational speed of the motor is limited. If the voltage U rises above a second threshold value S2, the rotational speed is limited to a maximum extent so that the diode cannot heat up any further.

Figure 5:
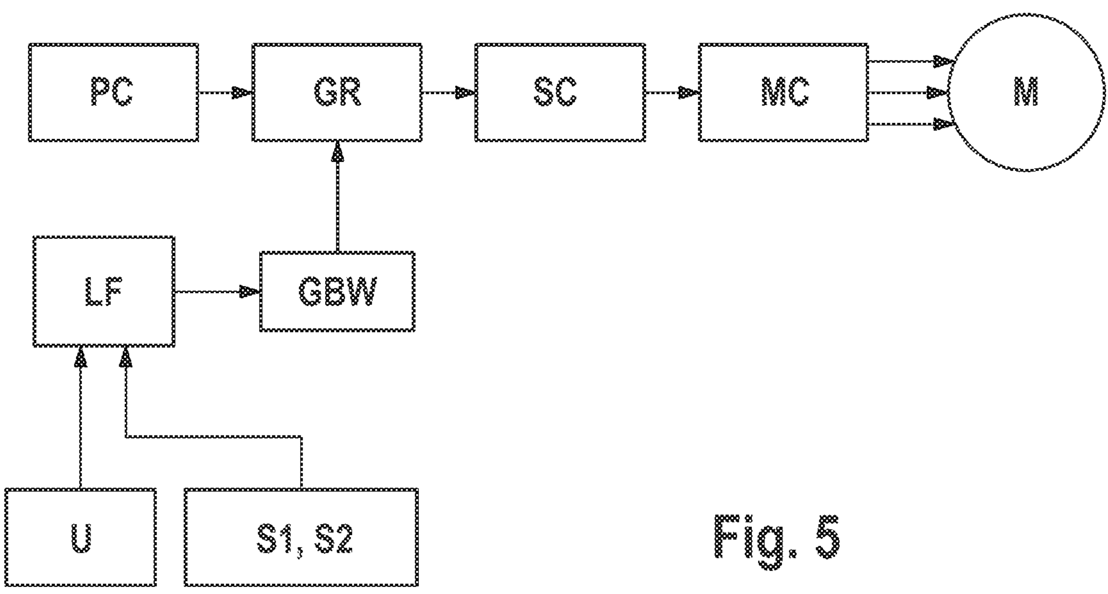
FIG. 5 shows a schematic representation of the method for protecting the diode.

FIG. 5 shows a schematic representation of the method for protecting the diode. The first and the second threshold value S1, S2 are preferably stored in an EEPROM memory. The power factor LF is determined by means of the threshold values S1, S2 and the measurement of the current diode voltage U, from which a speed limit value GBW is derived. In the event that the speed setpoint value requested by the pressure control device PC is larger than the speed limit value GBW, the speed setpoint value is then reduced to the speed limit value GBW. The speed setpoint value is then transmitted to the speed controller SC, which calculates a torque setpoint value from the speed setpoint value. Finally, the motor controller calculates a suitable electrical actuation process of the motor from the torque setpoint value.

Figure 6:
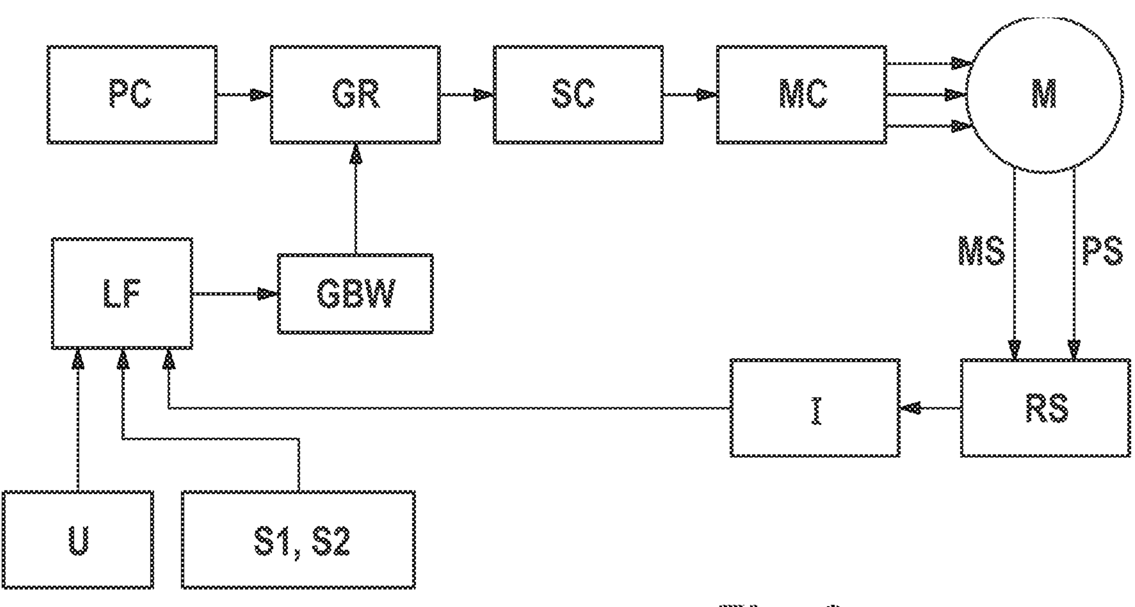
FIG. 6 shows a schematic representation of the method in a first operating mode.

FIG. 6 shows a schematic representation of the method in a first mode of operation, wherein the method is only carried out in this first mode of operation when the diode is conductive.

In addition to the diode voltage U and the threshold values S1, S2, the diode current I is also included here. To calculate the diode current I, a recuperation current RS and a capacitor current I_C are determined. The recuperation current RS is calculated—preferably in the computing unit, which is in particular a microcontroller—from the measurement of the three motor terminal voltages MS and the measurement of the motor phase currents PS. The capacitor current is calculated from the gradient of the capacitor voltage (before the Zener voltage is reached) and the capacitance value of the capacitor: I_C=C*(dU/dt). The difference between the recuperation current RS and the capacitor current I_C results in the diode current I. As soon as the diode current I exceeds a threshold value, the diode begins to conduct.

Figure 7:
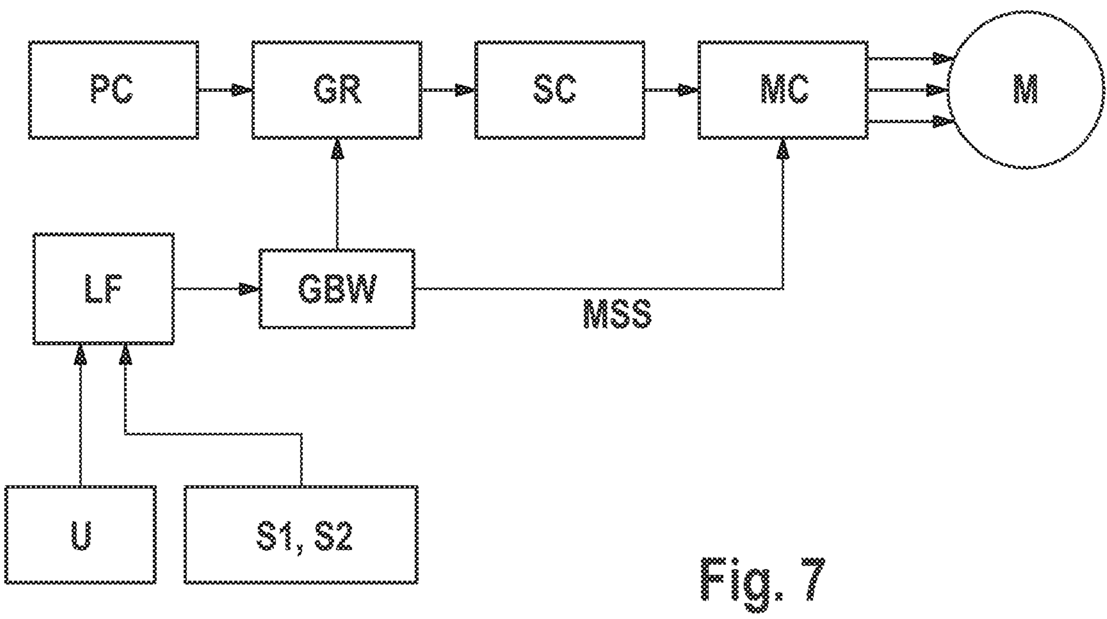
FIG. 7 shows a schematic representation of the method in a second operating mode.

FIG. 7 shows a schematic representation of the method in a second mode of operation, with the method being carried out in this second mode of operation in such a way that recuperation energy is also converted into thermal energy by means of the motor.

As a variant of FIG. 6, the minimum motor reactive current MSS is transmitted to the motor controller on the basis of the calculations around the speed limit value GWB. In this second operating mode, the basic idea is that the reactive current in the motor is increased while at the same time the maximum recuperation power is reduced according to the derating information. In comparison to FIG. 5, in the variant of FIG. 6 the reactive current in the motor is increased in addition to the limitation of the nominal motor speed. By increasing the reactive current in the motor, the speed limit value GWB can be reduced at the same time.

Figure 8:
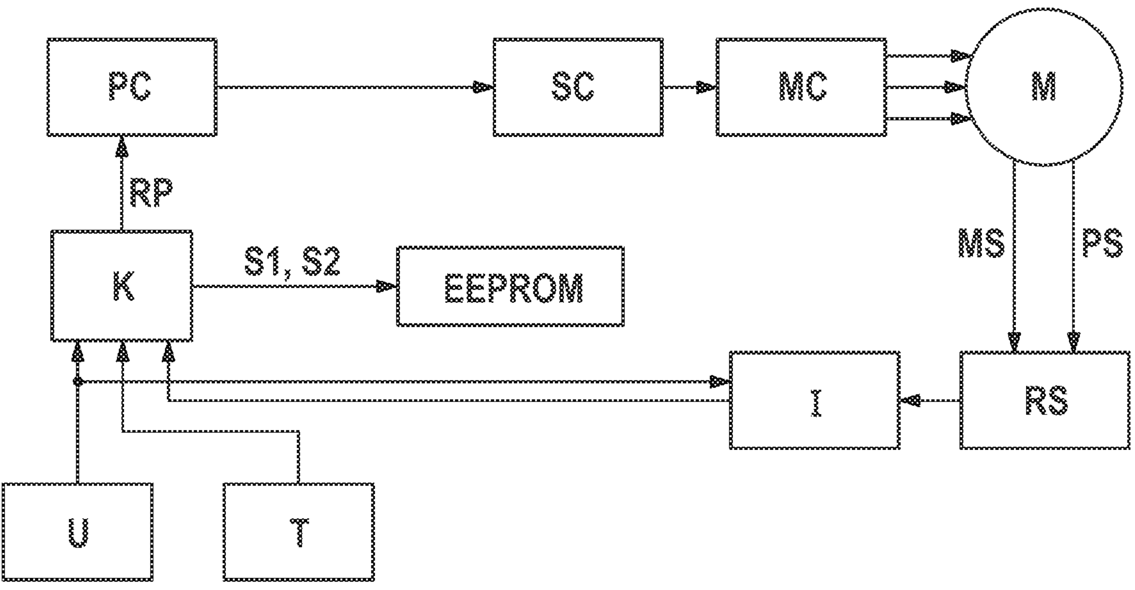
FIG. 8 shows a schematic representation of the method during regular recalibration.

FIG. 8 shows a schematic representation of the method during regular recalibration. A recuperation pulse RP is generated for the calibration and is fed to the pressure control device PC. This recuperation pulse RP is a test pulse which briefly energizes the diode in the reverse direction. This allows different parameters to be measured, e.g. the motor phase currents PS and the three motor terminal voltages MS, from which the diode current I is calculated. Various values are included in the calibration K of the diode, e.g. the diode voltage U and a diode temperature (junction temperature) T and a diode current I. The threshold values S1, S2 calculated by the calibration K are stored in an EEPROM memory.

As an alternative or in addition to the regular recalibration, an initial calibration is provided, which may be carried out during the production of the control device.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for controlling rotational speed or torque of a motor in order to protect a suppressor diode in a control device of a vehicle, wherein the suppressor diode converts recuperation energy of the motor into thermal energy, the method comprising:

determining at least one of a current junction temperature and a diode voltage of the suppressor diode when current is in a reverse current direction through the diode;

determining derating information based on the dependency between a power factor and the at least one of the current junction temperature and the diode voltage;

controlling one of the rotational speed and the torque of the motor based on the derating information such that the junction temperature of the suppressor diode does not exceed a predetermined junction temperature limit value and converting hydraulic energy back into electrical energy by the motor via a spindle screw drive when the motor is operated in recuperation mode.

2. The method as claimed in claim 1, further comprising storing the dependence between the junction temperature or diode voltage and the power factor in the derating information.

3. The method as claimed in claim 1, further comprising using a current recuperation power.

4. The method as claimed in claim 1, further comprising:

measuring the current diode voltage; determining a current recuperation power of the motor;

determining a power factor using the diode voltage and derating information;

determining a target power by multiplying the power factor by a current recuperation power;

determining a speed limit value by using the target power; and limiting the rotational speed of the motor on the basis of the speed limit value.

5. The method as claimed in claim 1, further comprising determining whether the suppressor diode is conductive, and wherein the method is carried out only if the suppressor diode is conductive.

6. The method as claimed in claim 1, further comprising converting the recuperation energy into thermal energy with the motor.

7. The method as claimed in claim 1, further comprising calibrating the suppressor diode by:

energizing the suppressor diode with a current in the reverse direction of the suppressor diode;

measuring the diode voltage; and measuring the junction temperature.

8. The method as claimed in claim 7, further comprising carrying out the calibration as a regular recalibration.

9. The method as claimed in claim 1, further comprising dropping the power factor when the voltage exceeds a lower threshold value, and limiting the rotational speed to a maximum extent so that the diode cannot heat up any further when the voltage rises above a second threshold value.

10. A rotational speed control system comprising:

a control loop; and a computing unit, wherein the computing unit has instructions for:

determining one of a current junction temperature and a diode voltage of a suppressor diode when current is in a reverse current direction through the diode;

determining derating information based on the dependency between a power factor and the at least one of the current junction temperature and the diode voltage; and controlling one of a rotational speed and a torque of a motor based on the derating information such that a junction temperature of the suppressor diode does not exceed a predetermined junction temperature limit value, and converting the hydraulic energy back into electrical energy by the motor via a spindle screw drive when the motor is operated in recuperation mode.

11. The system as claimed in claim 10, further comprising instructions for: measuring the current diode voltage when the current direction is in a reverse direction;

determining a current recuperation power of the motor;

determining a power factor using the diode voltage and the derating information;

determining a target power by multiplying the power factor by a current recuperation power;

determining a speed limit value by means of the target power; and limiting the rotational speed of the motor on the basis of the speed limit value.

12. The system as claimed in claim 10, wherein the computing unit carries out the instructions only if the suppressor diode is conductive.

13. The system as claimed in claim 10, wherein the motor converts recuperation energy into thermal energy.

14. The system as claimed in claim 10, further comprising instructions for calibrating the suppressor diode by:

energizing the suppressor diode with a current in the reverse direction of the suppressor diode;

measuring the diode voltage; and measuring the junction temperature.

15. The system as claimed in claim 14, wherein the calibration is carried out as a regular recalibration.

16. The system as claimed in claim 10, wherein the control loop and the computing unit are part of a control device for a vehicle with a rotational speed control system.

17. A rotational speed control system comprising:

a motor, a suppressor diode for a control device of a vehicle, wherein the suppressor diode converts recuperation energy of the motor into thermal energy, and wherein the suppressor diode has a predetermined junction temperature limit value; and wherein one of the rotational speed and the torque of the motor are controlled by derating information based on a power factor and one of a current junction temperature and a diode voltage when measured when current is in a reverse current direction to protect the suppressor diode such that the junction temperature of the suppressor diode does not exceed the predetermined junction temperature limit value; and a spindle screw drive when the motor is operated in recuperation mode so that the hydraulic energy is converted back into electrical energy by the motor via the spindle screw drive.

18. The system as claimed in claim 17, wherein a speed limit value of the motor is determined based on a target power, wherein the target power is a multiplication of the power factor and a current recuperation power, and wherein the power is dependent on the junction temperature or the diode voltage.

19. The system as claimed in claim 17, wherein one of the rotational speed and the torque of the motor are only controlled to not exceed the predetermined junction temperature limit value when the suppressor diode is conductive.

20. The system as claimed in claim 17, wherein the suppressor diode is regularly calibrated, and wherein the calibration includes a measurement of the diode voltage and the junction temperature when the suppressor diode is energized with the current in the reverse direction.

* * * * *